United States Patent Office 2,775,907
Patented Jan. 1, 1957

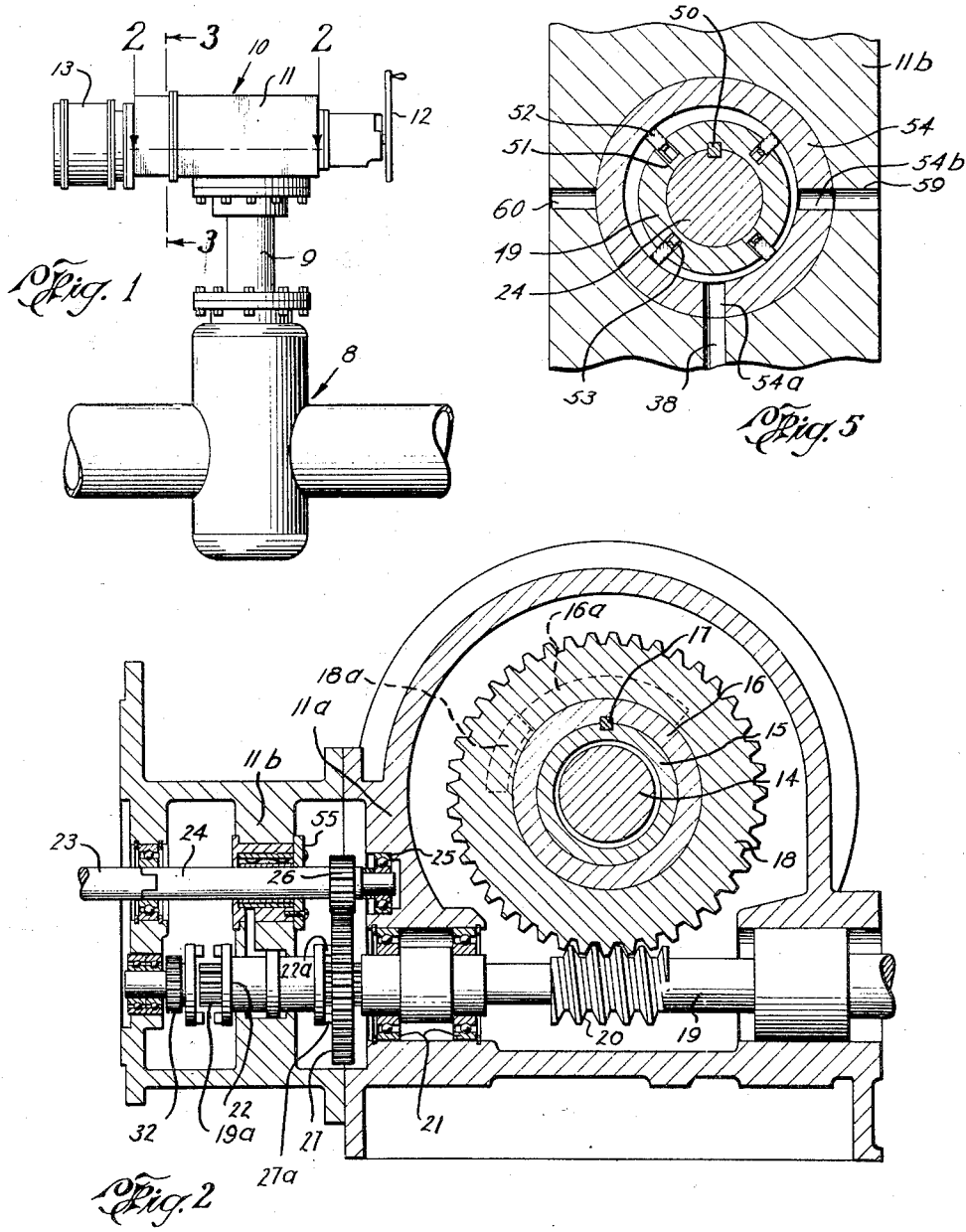

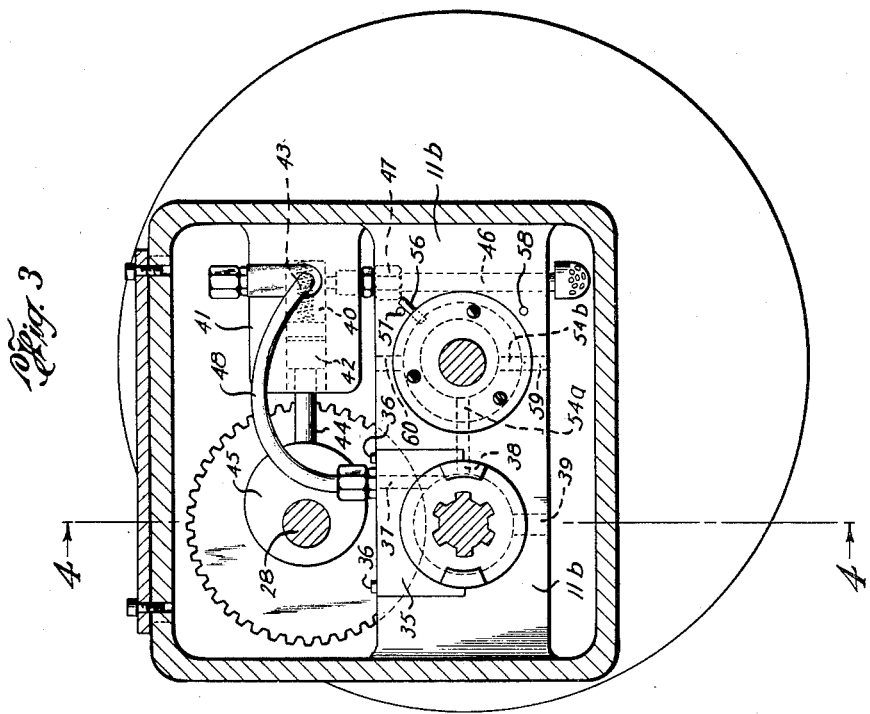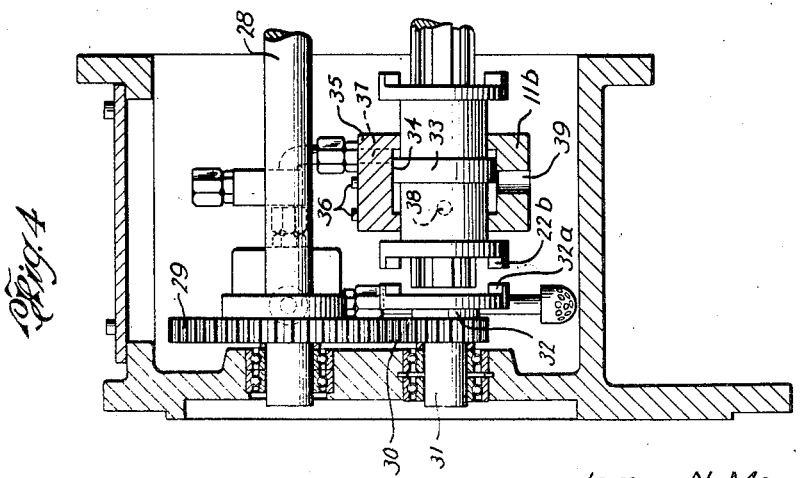
James N. Morrell
Leon Ince
INVENTORS

2,775,907

VALVE OPERATOR

James N. Morrell, Piney Point, and Leon Ince, Houston, Tex.

Application November 21, 1955, Serial No. 548,181

11 Claims. (Cl. 74—625)

This invention relates to improvements in valve operators and refers more particularly to valve operators having power and manually actuated means which may be selectively employed for operating a valve.

This invention is an improvement to the invention disclosed in the co-pending application of Lynn T. Elliott and Leon Ince, filed July 10, 1950, and identified by Serial No. 172,918. This application is a continuation of application Serial No. 188,417, filed October 4, 1950.

In valve operators of this general type it is desirable that both the power and manual actuating means never be connected to the rotary drive member of the operator at the same time. Many different mechanisms have been devised to accomplish this but all such mechanisms have been somewhat complicated, involving the use of springs biasing a clutch member toward one operative position and usually employing levers extending exteriorly of the operator housing for shifting the clutch member to the opposite position. A detent mechanism is employed, for example, in United States Patent No. 2,114,013, to secure the clutch member in the position from which it is biased by the spring.

In said co-pending application filed by Messrs. Elliott and Ince, a simplified clutch mechanism has been disclosed wherein the clutch member is not biased toward either position but is shifted to an operative position corresponding to the actuating means that is employed and which must pass through a neutral position in order to change or shift from one operative position to another. While this mechanism represents a great advance in the earlier art it is an object of this invention to further simplify the clutch shifting mechanism in valve operators of this type.

A further object is to provide a fluid actuating mechanism for shifting a clutch to power operating position employing a rotary pump which is actuated by the power take-off shaft of the operator for supplying fluid to the clutch shifting mechanism to shift the clutch to power operating position.

Another object is to provide an operator wherein a vane type pump is formed on the power take-off shaft of the power mechanism for supplying pressure fluid to a clutch shifting mechanism to shift the clutch to position for power actuation.

A still further object is to provide in a valve operator of the class described for a clutch shifting mechanism in which the clutch itself is provided with the pressure responsive member subject to pressure differentials built up as a function of the operation of one of the actuating means thus eliminating the requirement for any linkage between a separate pressure responsive member and the clutch.

Still another object is to provide a valve actuator of the class described wherein the clutch and its shifting mechanism are composed of a minimum number of parts.

Other and further objects of the invention will appear as the description proceeds.

In the accompanying drawings forming a part of the instant specification and wherein like reference numerals are used to indicate like parts in the various views:

Fig. 1 is a side elevational view of a valve and an operator therefor, the later embodying this invention;

Fig. 2 is a view upon an enlarged scale taken along the line 2—2 in Fig. 1 in the direction of the arrows;

Fig. 3 is a view taken along the line 3—3 in Fig. 1 in the direction of the arrows;

Fig. 4 is a view taken along the line 4—4 in Fig. 3 in the direction of the arrows; and Fig. 5 is a cross sectional view, upon an even larger scale, through the power take-off shaft and a rotary pump associated therewith taken on a plane normal to the axis of power take-off shaft.

The invention comprises, in general, a valve operator having both manual and power actuating means adapted to be selectively connected through gears to drive a rotary member having an actuating connection with a valve to be controlled. The two actuating means have separate gears which may be selectively connected to the rotary member for actuating it, through the medium of a clutch shiftable between the two gears. A fluid actuated means is provided for shifting the clutch and preferably includes a pressure responsive member formed on the clutch and energized on opposite sides by two separate pump means to shift the clutch from one operating position to another. Preferably the means for supplying pressure fluid to shift the clutch upon operation of the power means includes a rotary pump driven from the power take-off of the motor. This pump means may be a vane type pump wherein the vanes are actually held radially, relative to the shaft, and rotate therewith to pump fluid. A sleeve liner with an eccentric inner perpipheral wall may be mounted to rotate between limits permitting about 90° rotation so that the pump will provide pressure fluid through a single connection with the pressure responsive member regardless of the direction of rotation of the power take-off shaft. A reciprocating type pump means, operable upon actuation of the manual means, is usually preferred to shift the clutch to hand operating position, because of the limited rate of rotation of the hand wheel.

Referring more specifically to the drawings and particularly to Fig. 1, the usual valve is designated generally at 8 and has a yoke 9 to which is secured an operator designated generally by the numeral 10. The operator has a housing 11 for suitable gear trains, to be hereinafter more fully described, with a hand wheel or handcrank 12 extending exteriorly from one end of the housing and a motor means 13 mounted at the other end of the housing. The hand wheel and motor means constitute the turning means which are connected by the gears within the housing 11 to a rotary member or bushing nut which is operatively connected to the stem of a valve to be operated.

The valve 8 is a gate type valve which has a stem 14 shown in Fig. 2, extending through the yoke 9 and into the housing 11. This stem is secured by heavy threads to the bushing nut or rotary member 15. This rotary member preferably is removably received within a sleeve 16 and held against relative rotation in the sleeve by key 17. The sleeve 16 is suitably journaled within housing 11 by bearing means which, in the interest of simplicity, have not been shown in the drawings. Such journals may be provided on the one hand by conventional means as will be well understood by those skilled in the art to whom this invention is disclosed. On the other hand, such bearing means may be constructed as shown in the co-pending United States application Serial No. 172,841, filed July 10, 1950, by James N. Morrell, now Patent No. 2,724,978.

Sleeve 16 has mounted thereon for rotation, a worm gear 18. This worm gear has a depending lug 18a which is adapted to engage a radially extending lug 16a carried by the sleeve so as to impart rotary movement to the sleeve when the worm gear is rotated. However, by reference to Fig. 2, it will be seen that the worm gear may be turned through substantially 270° without engaging the lugs 16a and 18a. This provides a hammer blow for jarring a stuck valve member loose as will be appreciated by those skilled in the art.

The gear train for driving the rotary member 15 and 16 includes a shaft 19 journaled in housing 11. The shaft carries a worm 20 meshing with worm gear 18. The left end of this shaft, as viewed in Fig. 2, is mounted in ball bearing race assemblies 21 and has an extension 19a which is splined. This splined extension carries a clutch member 22 which is slidable thereon but is non-rotatable relative thereto.

The clutch member 22 is part of the clutch mechanism provided for selectively establishing a drive connection for the worm shaft 19 with either the manually operated turning means, including the hand wheel 12, or the power driven turning means including the motor 13. The present invention relates closely to this portion of the mechanism and the mechanism for shifting the clutch member 22 between its two operating positions.

The power driven turning means includes the shaft 23 which has a connection with the motor 13 for rotating the shaft. The right hand end of this shaft, as viewed in Fig. 2, has a drive connection with a power take-off shaft 24. Shaft 24 is journaled in partition 11a of the housing and the ball bearing race assembly 25.

Gear 26 is rigidly mounted on shaft 24 for rotation therewith and meshes with gear 27. The latter gear is rotatable on shaft 19 but carries parts 27a adapted to be engaged by confronting parts 22a of the clutch member, when the clutch member is in its Fig. 2 motor drive position. It will be appreciated that with the parts 22a and 27a in engagement, rotation of gear 27 will rotate the clutch member 22 which in turn is splined to shaft 19 to impart rotation thereto. This, of course, will turn the worm 20 and drive worm gear 18 in order to actuate the rotary member 15 and stem 14 of the valve.

Referring now to the connection between the hand wheel 12 and the clutch member 22, reference is made to Figs. 3 and 4 wherein shaft 28 is shown. The left hand end of this shaft, as viewed in Fig. 4, has a ball bearing journal in housing 11. The shaft carries the hand wheel exteriorly of the housing at the other end of the housing and the shaft extends substantially through the entire length of housing 11. In that portion of the housing in which the clutch member 22 resides, is a gear wheel 29, keyed to shaft 28, which meshes with gear 30. Gear 30 is mounted upon a stub shaft 31, best shown in Figs. 2 and 4. The stub shaft is journaled upon roller bearings in housing 11 and the gear 30 is secured against rotation thereon. Gear 30 has an extension 32 with parts 32a adapted to interengage with parts 22b of the clutch member. Thus, when the clutch member is shifted from its Fig. 2 position to its extreme position to the left, as viewed in Fig. 2, the interengaging parts 32a and 22b will connect gear 30 and the clutch member for rotation, one with the other. With the clutch member in this latter described position, it will be manifest that the shaft 19 will be turned upon actuation of the hand wheel 12 to operate the valve.

This invention relates particularly to the clutch 22 and the mechanism for selectively shifting clutch 22 to either of its two operative positions where it establishes a drive between the rotary member or bushing 15 and one of the actuating means. A pressure actuated system is provided including a pressure responsive member 33 which is carried by the clutch member 22 and may be formed integrally therewith. This pressure responsive member is mounted for reciprocal straightline movement within a cylinder 34. This cylinder is provided in part by a hollowed out portion formed in partition 11b of the operator housing, as shown in Fig. 3, together with an insert 35 which is secured to the partition 11b by cap screws 36. By removing the insert 35 the clutch 22, with pressure responsive member 33, may be readily placed within the hollowed out portion of partition 11b and then secured therein by fastening insert 35 in place.

Cylinder 34 is provided with pressure fluid inlet ports 37 and 38 at its ends respectively. An outlet port 39 is located mid-way of the cylinder and has considerably greater cross sectional area or capacity than either of the inlet ports 37 or 38. The outlet port discharges into the bottom of the housing 11 which forms a sump for a suitable lubricant or the like.

The shifting mechanism is completed by pump means for circulating fluid under pressure to cylinder 34. These pump means are operable upon actuation of the two actuating means. Turning of the hand wheel will cause pressure fluid to be pumped into inlet 37 so as to create a pressure differential across annular piston 33 to shift the clutch member to the left as viewed in Fig. 4 so as to engage the teeth 32a connected to the hand wheel driven gear 32. The pump means for forcing pressure fluid in through inlet 38 is associated with the power driven means so that operation of motor 13 will cause the building up of a pressure differential across piston 33 so as to shift the clutch member to the right as viewed in Fig. 4.

Preferably the pump means associated with the hand wheel is of the reciprocal type because ordinary hand wheel operation is not very rapid and a rotary pump driven from the hand wheel shaft wouldn't be as satisfactory as a reciprocal pump. The reciprocal pump is probably best shown in Fig. 3 and includes a pump cylinder 40 formed within a protrusion 41 extending inwardly from the housing wall. A plunger 42 is reciprocally mounted within the cylinder 40 and is urged outwardly therefrom by a coiled spring 43 which is compressed between the closed end of the cylinder and the plunger 42. The plunger carries a piston rod 44 which bears at its free end against an eccentric 45 secured to shaft 28 for rotation therewith. Thus, rotation of the shaft will actuate the piston 42, due to the presence of spring 43, providing alternate suction and pressure strokes.

An inlet for fluid to be pumped includes a stand pipe 46 with a screen covered lower end residing near the bottom of the housing, so that on the suction stroke, the fluid is drawn into cylinder 40. A check valve, shown schematically at 47, controls flow through the stand pipe 46 to prevent back flow therethrough. The outlet for the cylinder 40 connects through a pipe 48 to the inlet 37 so that pressure fluid is supplied to the right hand end of cylinder 34, as the cylinder is viewed in Fig. 4.

The pump associated with the power take-off shafts 23 and 24 may be a rotary type because the shafts will rotate at a high R. P. M. under operating conditions. Preferably a rotary type pump is carried directly by shaft 24 on which the motor driven gear 26 is mounted. A vane type pump lends itself very well to this use making it possible to utilize a very simple structure. This is possible because very little actual efficiency of the pump is required and very little pressure need be developed in the pump maens.

The vane type pump is best shown in Figs. 2, 3 and 5 and includes a collar 49 mounted on shaft 24 and secured against rotation thereon by a key 50. The collar is provided with a plurality of radially extending vane ways 51 in which the vanes 52 are mounted. In back of the vanes, preferably are resilient means such as springs 53, urging the vanes outwardly so as to engage the inner wall of a cylinder 54. The cylinder is provided with an inner bore which is eccentric to the axis of rotation of shaft 24. The cylinder member 54 may have a circular outer periphery which fits in a cylindrical opening formed in partition 11b, concentric with the rotational axis of shaft 24. The bore in member 54 is then eccentric relative to the axis of member 54. The member 54 has an enlarged head at one end adapted to fit an enlarged diameter portion of the opening in partition 11b to position the member within the opening. An apertured plate or cover 55 fits over shaft 24 and is secured as by screws to the member 54 to complete the cylinder.

The member 54 is provided with two openings 54a and 54b. The member is rotatably mounted within the opening and partition 11b but rotation is limited to approximately 90°, the spacing between the ports 54a and 54b, by a stop pin 56 extending radially from plate 55 and two stop pins 57 and 58 protruding from partition 11b, as best illustrated in Fig. 3. The friction of the vanes acting against the inner cylindrical wall of member 54 will cause the member to rotate until the pin 56 engages one of the stops 57 and 58. Reverse rotation of the shaft and the collar 49 will cause reverse rotation of the member 54 until the stop pin 56 engages the other of the stops 57 and 58.

With the member 54 in its two extreme positions the ports 54a and 54b will communicate with an outlet port 38 formed in partition 11b. It will be remembered that the port 38 is also the inlet port through which pressure fluid is introduced to the cylinder in which the annular piston 33 resides. The other of the ports 54a and 54b will, in this position of member 54, communicate with one of the inlet ports 59 and 60 formed in partition 11b. These latter ports 59 and 60 open into the interior of the housing below the usual lubricant level and provide inlets for fluid to be pumped by the vane pump.

The reason for the eccentric character of the bore in member 54 and the rotational mounting of the member 54 is to provide a proper pumping chamber regardless of the direction of rotation of the shaft 24, so that fluid will be pumped to shift the clutch when the motor 13 is operated to either open or close the main valve 8. With this arrangement, in either operative position of member 54, the point of nearest approach between the collar 49 and the inner periphery of member 54 will be between the outlet opening 38 and the operative one of the inlets 59 and 60. The arrangement is such that regardless of the operative position in which the member 54 is driven by the friction of the vane elements the other of the inlets will be closed by the outer peripheral wall of member 54, which will cover it.

As indicated before, the requirements for pumped fluid are not great and the pressure to be developed by the vane type pump need be relatively minor. For this reason rather loose fitting clearances or tolerances may be provided between the shaft 24 and the openings in member 54 and cover plate 55. Also, it will be appreciated that lubricant will be continuously forced between these tolerances so as to substantially eliminate any possibility of wear between these relatively moving parts. Of course, the shaft 24 has a ball bearing journal in the housing 11 so that a bearing surface need not be provided between the shaft and the parts of the vane pump.

Reference is now made back to the worm shaft 19. The right hand end of this shaft, as viewed in Fig. 2, is shown as broken away but it is to be understood that it may be connected to a suitable limit switch and/or torque means so as to discontinue motor operation of the operator when the main valve 8 is seated in either fully open or fully closed position. This is all in accordance with conventional construction of motor driven operators of this type and, in the interest of simplicity, a discussion and showing of this conventional apparatus is dispensed with.

It is thought that the operation of this invention is apparent from the foregoing description. With the operator mounted upon the valve 8 and the interior of housing 11 containing a suitable lubricant such as SAE 10 motor oil to a sufficient level to adequately cover the top of partition 11b, the valve 8 may be operated either by the manual means or the motor means. If the hand wheel 12 is turned, and it is assumed that the clutch member 22 prior to the operation is in motor drive position, then the initial turning of the hand wheel will not affect the shaft 19 and worm 20 because the hand wheel driven gear extension 32 is not engaged with the clutch member 22. However, initial turning of the hand wheel will cause the eccentric 45 to reciprocate the piston rod 44 and force fluid through the pipe 48 and inlet 37 behind the pressure responsive member 33 so as to create a pressure differential thereacross tending to urge the clutch toward position to engage teeth 32a and clutch teeth 22b. At the time the clutch member moves into engagement with clutch parts 32a, the outlet port 39 will have been uncovered so as to permit free circulation of fluid through the chamber, stopping the pressure differential across the member 33. In actual operation the clutch member is forced into full engagement and then will actually back off slightly so as to create a floating situation permitting free circulation of fluid through the cylinder 34 and outlet 39. If the rate of turning of the hand wheel is changed a slight shifting of piston 33, relative to the port 39, will take place to again equalize the pressure across the piston 33. The clutch member will stay in the hand wheel operating position until operation of the motor takes place. However, it will be understood that there is no force biasing the clutch toward hand wheel operating position or toward motor operating position.

When the motor is energized, the shaft 24 will be rapidly rotated causing the vane pump to circulate fluid through outlet 38 from cylinder 40, which passage 38 is the inlet into the interior of the clutch oprating cylinder 34 so as to create the pressure differential across piston 33 tending to drive the piston to the right as viewed in Figs 2 and 4. The piston again has been found in practice to move into full engagement and then to slightly back up so as to find a floating position whereby the pressure across the pressure responsive member 33 is equalized. This, of course, again is possible because of the uncovering of the large capacity outlet 39.

The clutch member 22 is splined to the shaft 19 so as to provide a drive connection selectively with either of the gears 26 and 29 which are driven by the motor and hand wheel respectively. In order for the clutch to pass from one operative position to another it must necessarily pass through a neutral position, so that at no time will both of the actuating means be connected to the clutch member 22 so as to drive the rotary member 15—16. This is important for it avoids any possibility of the hand wheel being operatively connected during motor operation.

The arrangement is such that the clutch member is not biased toward either operative position and all detent means of prior patents have been eliminated. The member is always free to be moved to either operative position in response to the actuating means that is being energized. Of course, the vane type pump will create a greater pressure on the side of the piston 33 with which it communicates than will the hand operated reciprocal pump so that in the event both the hand wheel and motor are energized the clutch member will move to motor operating position. However, before the motor operating position is reached the clutch will be disconnected from the hand wheel gear train to avoid any possibility of a rapid increase in rate of rotation of the hand wheel due to motor operation.

The construction is such that no operating levers for shifting the clutch member are required which extend exteriorly of the housing, thus eliminating the necessity for packing about a moving shaft.

The operator shifting mechanism is such that the lubricant for the gear trains within the operator may be utilized as the actuating fluid for shifting the clutch. It is contemplated that where it is desired the fluid circulated may be directed from the outlet port of the clutch shifting cylinder upon any gears or other moving parts which it is desirable to lubricate.

It is thus seen that a very simple and yet rugged operator clutch shifting mechanism has been provided. This mechanism lends itself to easy fabrication and assembly reducing the overall cost of the operator over those that have gone before. The operator has great utility in operating large valves for controlling flow through large diameter pipe lines and the like and has a measure of safety heretofore unknown in valve operators of the hand wheel and motor driven type.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and its within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. In a non-coincidental operator having a rotary member for operating a valve or the like, in combination, a power actuatable gear, a manually actuatable gear, gear means for driving the rotary member, a reciprocable clutch member operable in either of two positions to provide a drive connection in one of said positions between said gear means and the power actuatable gear and in the other of said positions between the gear means and the manually actuatable gear, fluid actuated mechanism for shifting said clutch member from one of said operable positions to the other through an intermediate neutral position, a pressure responsive member carried by said clutch member as a part thereof, a cylinder for said pressure responsive member, the respective axes of said clutch member and of said cylinder being coincidental, means for actuating said power actuatable gear, means for simultaneously supplying actuating fluid to the cylinder on one side of said pressure responsive member to shift said clutch member to power drive connection position if it is not already in such power drive connection position, means for actuating said manually actuatable gear, and means for simultaneously supplying actuating fluid to the cylinder on another side of said pressure responsive member to shift said clutch member to manual drive connection position if it is not already in such manual drive connection position.

2. A non-coincidental operator as set forth in claim 1, in which, a power shaft is connected to said power actuatable gear to turn it, a manual shaft is connected to said manually actuatable gear to turn it, a power pump is provided for direct actuation when said power shaft is turned, a manual pump is provided for direct actuation when said manual shaft is turned, whereby when said respective pumps are so actuated actuating fluid will be supplied respectively to opposite sides of said pressure responsive member.

3. A non-coincidental operator as set forth in claim 2, in which, the fluid actuating mechanism is enclosed within a clutch mechanism housing, a partition in said housing has said cylinder therein, an eccentric on said manual shaft is provided to operate said manual pump, a further cylinder is provided for said power pump in said partition, said power shaft extending through said further cylinder, vane members are mounted on said power shaft within said further cylinder, and said pressure responsive member comprises a circumferential flange normal to the axis of said clutch member, whereby a single housing portion may enclose all of said mechanism and eliminate linkages between said respective shafts and pumps and between said pumps and clutch member.

4. In a non-coincidental valve operator having a rotary member for operating a valve, in combination, a power actuatable gear, a manually actuatable gear, gear means for driving the rotary member, a clutch mechanism having a reciprocable clutch member operable in either of two positions to provide a drive connection in one of said positions between said gear means and the power actuatable gear and in the other of said positions between the gear means and the manually actuatable gear, fluid actuated mechanism for shifting said clutch member from one of said operable positions to the other through an intermediate neutral position, a pressure responsive member carried by said clutch member as a part thereof, a housing for said clutch mechanism and said fluid actuated mechanism, a motor for actuating said power actuatable gear, means for supplying actuating fluid to said pressure responsive member when said motor is actuated to shift said clutch member in one direction to power drive connection position if it is not already in such power drive connection position, a handwheel for actuating said manually actuatable gear, and means for supplying actuating fluid to another side of said pressure responsive member when said handwheel is turned to shift said clutch member to manual drive connection position if it is not already in such manual drive connection position.

5. In combination, in an operator, for an openable and closable device like a valve, having a motor and a handcrank, a rotary driven member with a gear means for driving it, a first shaft connecting a first gear and said motor, a second shaft connecting a second gear and said handcrank, a clutch mechanism for selectively providing a drive connection between the gear means and one of the first and second gears, said clutch mechanism having a clutch member, a pressure responsive member rigidly connected to said clutch member, a cylinder for said pressure responsive member, the respective axes of said clutch and of said cylinder extending in the same direction, a hydraulic shifting mechanism for shifting the pressure responsive member to shift the clutch to a drive position corresponding to either gear so driven, a rotary pump surrounding and driven by the shaft connected to the first gear to urge the shifting mechanism in one direction to provide a power drive connection whenever said motor is actuated, and a pump means in said shifting mechanism operated by the second shaft to move the shifting mechanism in the other direction to provide a manual drive when said handcrank is turned, the forces respectively produced by said rotary pump and said pump means being respectively exertable upon opposite sides of said pressure responsive member in said cylinder.

6. In a non-coincidental valve operator of a type having a rotary member for actuating a valve, in combination, recurrently actuatable power means and manual actuating means selectively connectible individually in positive coupling relation to a rotary member through a shiftable clutch member, a fluid actuated clutch shifting mechanism having an annular flange extending around said clutch member, said flange adapted to act in the manner of a piston, a power take-off shaft included in the power actuated connection, a vane type rotary pump automatically actuated by said shaft to supply pressure fluid against one side of said flange upon operation of the power means, said pump including a collar mounted on the shaft for rotation therewith, vanes mounted in radial vane ways formed in the collar, a cylinder surrounding the collar and vanes the inner surface of the cylinder being eccentric relative to the shaft and collar with inlet and outlet ports located adjacent the location of closest approach between the collar and cylinder, and means for providing a fluid source for said pumps.

7. In a non-coincidental valve operator of a type having a rotary member for actuating valve, in combination, recurrently actuatable reversible power means and manual actuating means, means for selectively connecting one of said two first-named means in positive coupling relation to a rotary member through a shiftable clutch member, a fluid actuated clutch shifting mechanism having a pressure responsive member rigidly connected to said clutch member, said pressure responsive member being in a cylinder, a power take-off shaft included in the power actuated connection, and a vane type rotary pump automatically actuated by the shaft for supplying pressure fluid to the shifting mechanism whenever there is operation of the power means, said pump including a collar mounted on the shaft for rotation therewith, vanes mounted in radial vane ways formed in the collar, and a cylinder surrounding the collar and vanes the inner surface of the cylinder being eccentric thereof with inlet and outlet ports located adjacent the location of closest approach between the collar and the cylinder, said cylinder being rotatably mounted about the shaft between limits to provide pumping chambers irrespective of the direction of rotation of the shaft and collar, each chamber discharging through a common outlet connection to the power drive side of said first-mentioned cylinder in the clutch shifting mechanism.

8. In a non-coincidental valve control unit adapted to be attached to valve to move the stem thereof, said valve control unit having a recurrently actuatable reversible motor and a handcrank, apparatus comprising, in combination, a manual driven gear connected to and rotatable by the turning of said handcrank, a power shaft connected to and rotatable by said motor whenever said motor is actuated, a power driven gear positively connected to said power shaft, a clutch shaft having a reciprocable clutch member thereon with respective power manual positive clutching parts in spaced opposed relation, a pressure responsive member rigidly connected to said clutch member, a complementary manual clutching member rigidly connected to said manual driven gear, a complementary power clutching member rigidly connected to said power driven gear, a power pump cylinder surrounding said power shaft, and rotary power pump parts in said cylinder to pump liquid automatically upon actuation of said motor to move said pressure responsive member to move said clutch member into engagement with said complementary power clutching member if out of such position when said motor is actuated.

9. In a non-coincidental valve control unit adapted to be attached to a valve to move the stem thereof, said valve control unit having a recurrently actuatable reversible motor and a handcrank, apparatus comprising, in combination, a manual driven gear connected to and rotatable by the turning of said handcrank, a power shaft connected to and rotatable by said motor whenever said motor is actuated, a power driven gear positively connected to said power shaft, a clutch shaft, a worm connected to and rotatably by said clutch shaft when said clutch shaft turns to rotate a worm wheel and move said valve stem, a reciprocable clutch member on said clutch shaft in slidable, non-rotatable relation thereto, said clutch member having respective power and manual positive clutching parts in spaced opposed relation, a pressure responsive member rigidly connected to said clutch member and movable in the same direction therewith, a complementary manual clutching member rigidly connected to said manual driven gear, a complementary power clutching member rigidly connected to said power driven gear, a power pump to pump liquid automatically upon actuation of said motor to move said pressure responsive member to move said clutch member into engagement with said complementary power clutching member if out of such position when said motor is actuated, and means to shift said clutch member automatically upon the initial turning of said handcrank to move said pressure responsive member in the other direction to move said clutch member into engagement with said complementary manual clutch member if out of said position when said handcrank is turned.

10. In a non-coincidental valve control unit adapted to be attached to a valve to move the stem thereof, said valve control unit having a recurrently actuatable reversible motor and a handwheel, apparatus comprising, in combination, a manual driven gear connected to and rotatable by the turning of said handwheel, a power shaft connected to and rotatable by said motor whenever said motor is actuated, a power driven gear positively connected to said power shaft, a clutch shaft having a reciprocable clutch member thereon with respective power and manual positive clutching parts in spaced opposed relation, a pressure responsive member rigidly connected to said clutch member, a complementary manual clutching member rigidly connected to said manual driven gear, a complementary power clutching member rigidly connected to said power driven gear, pump means actuated by the turning of said handwheel to pump liquid against said pressure responsive member to move said pressure responsive member to move said clutch member into engagement with said complementary manual clutching member if out of said position when the turning of said handwheel begins, and means responsive to the actuation of said motor to move said clutch member into engagement with said complementary power clutching member of out of such position when said motor is so actuated.

11. In a non-coincidental valve control unit adapted to be attached to a valve to move the stem thereof, said valve control unit having a recurrently actuatable reversible motor and a handcrank, apparatus comprising, in combination, a manual shaft connected to and rotable by the turning of said handcrank, a manual driven gear positively connected to said manual shaft during the turning of said handcrank, a power shaft connected to and rotatable by said motor whenever said motor is actuated, a power driven shaft positively connected to said power shaft during the turning of said motor, a clutch shaft having a reciprocable clutch member thereon with respective power and manual positive clutching parts in spaced opposed relation, a pressure responsive member mounted on said clutch member and movable therewith, said pressure responsive member being in a cylinder coaxial with said clutch shaft, a complementary manual clutching member rigidly connected to said manual driven gear, a complementary power clutching member rigidly connected to said power driven gear, a rotary power pump cylinder surrounding said power shaft, power pump parts mounted on said power shaft and in said power pump cylinder to pump liquid automatically upon actuation of said motor into one end of said first-named cylinder to move said pressure responsive member to move said clutch member into engagement with said complementary power clutching member for a power operation of said valve during the turning of said motor, a manual pump cylinder having a plunger projecting toward said manual shaft, a member on said manual shaft to move said plunger when said handcrank is turned to pump liquid manually into the other end of said first-named cylinder to move said pressure responsive member to move said clutch member into engagement with said complementary manual clutching member for a manual operation of said valve during the turning of said handcrank.

References Cited in the file of this patent

UNITED STATES PATENTS

| 1,710,441 | Turney | Apr. 23, 1929 |
| 2,114,013 | Ball | Apr. 12, 1938 |
| 2,117,852 | Pearmain | May 17, 1938 |
| 2,286,597 | Bruckel | June 16, 1942 |
| 2,318,010 | Panish | May 4, 1943 |
| 2,340,999 | Trott | Feb. 8, 1944 |
| 2,352,140 | Trott | June 20, 1944 |

FOREIGN PATENTS

| 897,852 | France | June 12, 1944 |